United States Patent
Choi et al.

(10) Patent No.: US 11,967,340 B2
(45) Date of Patent: Apr. 23, 2024

(54) METHOD FOR DETECTING SPEECH IN AUDIO DATA

(71) Applicant: ActionPower Corp., Seoul (KR)

(72) Inventors: Subong Choi, Seoul (KR); Dongchan Shin, Seoul (KR); Jihwa Lee, Seoul (KR)

(73) Assignee: ActionPower Corp., Seoul (KR)

( * ) Notice: Subject to any disclaimer, the term of this patent is extended or adjusted under 35 U.S.C. 154(b) by 0 days.

(21) Appl. No.: 18/340,767

(22) Filed: Jun. 23, 2023

(65) Prior Publication Data

US 2023/0419988 A1 Dec. 28, 2023

(30) Foreign Application Priority Data

Jun. 24, 2022 (KR) ........................ 10-2022-0077482

(51) Int. Cl.
*G10L 25/78* (2013.01)
*G10L 21/0272* (2013.01)
*G10L 25/18* (2013.01)
*G10L 25/30* (2013.01)

(52) U.S. Cl.
CPC .......... *G10L 25/78* (2013.01); *G10L 21/0272* (2013.01); *G10L 25/18* (2013.01); *G10L 25/30* (2013.01)

(58) Field of Classification Search
CPC ..... G10L 25/78; G10L 21/0272; G10L 25/18; G10L 25/30
See application file for complete search history.

(56) References Cited

U.S. PATENT DOCUMENTS

| 8,842,198 B2 | 9/2014 | Sekiya et al. |
| 10,706,857 B1* | 7/2020 | Ramasubramanian ...................... G10L 17/10 |
| 11,145,302 B2 | 10/2021 | Byun et al. |
| 2008/0015846 A1 | 1/2008 | Acero et al. |
| 2018/0308487 A1* | 10/2018 | Goel .................... G10L 15/1815 |
| 2020/0026760 A1* | 1/2020 | Chiu ....................... G06F 40/20 |
| 2020/0202869 A1* | 6/2020 | Wang ...................... G10L 17/18 |
| 2021/0233511 A1* | 7/2021 | Li ............................. G06N 3/04 |
| 2022/0165247 A1 | 5/2022 | Kang et al. |
| 2022/0253700 A1* | 8/2022 | Sun ..................... G10L 21/0232 |
| 2022/0270611 A1* | 8/2022 | Tuo ......................... G10L 17/26 |

(Continued)

FOREIGN PATENT DOCUMENTS

| JP | 2012142745 A | 7/2012 |
| KR | 19970004551 A | 1/1997 |

(Continued)

OTHER PUBLICATIONS

Allowed Korean Claims Jun. 29, 2023 (Year: 2023).*

(Continued)

*Primary Examiner* — Fariba Sirjani
(74) *Attorney, Agent, or Firm* — Seed IP Law Group (57) ABSTRACT

Disclosed is a method for detecting a voice from audio data, performed by a computing device according to an exemplary embodiment of the present disclosure. The method includes obtaining audio data; generating image data based on a spectrum of the obtained audio data; analyzing the generated image data by utilizing a pre-trained neural network model; and determining whether an automated response system (ARS) voice is included in the audio data, based on the analysis of the image data.

10 Claims, 5 Drawing Sheets

(56) References Cited

U.S. PATENT DOCUMENTS

2022/0328064 A1* 10/2022 Shriberg ............... A61B 5/165
2023/0130634 A1*  4/2023 Sainath ............... G06N 3/0442
                                                    704/232

FOREIGN PATENT DOCUMENTS

| KR | 100139342 B1 | 7/1998 |
| KR | 20090033437 A | 4/2009 |
| KR | 20190101630 A | 9/2019 |
| KR | 20200126951 A | 11/2020 |
| KR | 102260219 B1 | 6/2021 |
| KR | 20210137665 A | 11/2021 |
| KR | 102363324 B1 | 2/2022 |
| KR | 102378066 B1 | 3/2022 |
| KR | 20220071522 A | 5/2022 |

OTHER PUBLICATIONS

Kang et al., "Shooting sound analysis using convolutional neural networks and long short-term memory," *The Journal of the Acoustical Society of Korea* 41(3):312-318, 2022.

Lee, "A Study on a Non-Voice Section Detection Model among Speech Signals using CNN Algorithm," *Journal of Convergence for Information Technology* 11(6):33-39, Jun. 28, 2021. DOI: https://doi.org/10.22156/CS4SMB.2021.11.06.033.

* cited by examiner

METHOD FOR DETECTING SPEECH IN AUDIO DATA

CROSS-REFERENCE TO RELATED APPLICATION

This application claims priority to and the benefit of Korean Patent Application No. 10-2022-0077482 filed in the Korean Intellectual Property Office on Jun. 24, 2022, the entire contents of which are incorporated herein by reference.

BACKGROUND

Technical Field

The present disclosure relates to a method for detecting a voice, and more particularly to a technique of detecting a specific voice from input audio data.

Description of the Related Art

An interactive voice response system (IVRS) is frequently used with advantages of reducing operating costs and efficient call routing in telephone call-based services. IVRS uses a human voice or text-to-speech (TTS) voice, which is recorded in advance, which is referred to as an IVR voice or an automated response system voice (ARS). An example of the IVR voice includes an IVRS or an incoming rejection voice in phone calls.

The IVR voice degrades the accuracy of the model in a voice-related service and acts as a noise to cause an undesired operation, so that the IVR voice needs to be erased. However, the IVR voice includes actual human voices so that it is difficult to detect the IVR voice using a silence, noise, and music-based VAD method of the related art.

Korean Registered Patent No. 10-0139342 (Mar. 2, 1998) discloses a method of controlling calls by detecting an automatic answering device.

BRIEF SUMMARY

The present disclosure had been made in an effort to provide a method for detecting a specific voice (for example, automated response system (ARS) voice and interactive voice response (IVR) voice) from audio data. For example, various embodiments of the present disclosure provide a method for detecting a voice from audio data which detects an interactive voice (for example, an ARS voice or an IVR voice) using a pre-trained neural network model (for example, convolutional recurrent neural network (CRNN) model) and detects a voice from audio data which identifies the interactive voice (for example, ARS voice or IVR voice) and an actual human voice from a given voice.

In the meantime, the technical benefits of the present disclosure is not limited to the technical benefits mentioned above, and various other technical benefits may be included within the range apparent to those skilled in the art from the content to be described below.

In order to achieve the above-described benefits, according to an aspect of the present disclosure, a method executed by a computing device is disclosed. The method includes obtaining audio data; generating image data based on a spectrum of the obtained audio data; analyzing the generated image data by utilizing a pre-trained neural network model; and determining whether an automated response system (ARS) voice is included in the audio data, based on the analysis of the image data.

As an alternative, the generating of image data includes: generating a mel-spectrogram based on a spectrum of the obtained audio data.

As an alternative, the generating of image data further includes: generating a plurality of frames by dividing the generated mel-spectrogram in a predetermined time unit.

As an alternative, the analyzing of generated image data includes: extracting a feature on the image of the mel-spectrogram by utilizing a first neural network model; and additionally extracting a time-series feature of the mel-spectrogram by utilizing a second neural network model.

As an alternative, the first neural network model includes a convolutional neural network (CNN) model and the second neural network model includes a long short-term memory (LSTM) model.

As an alternative, the mel-spectrogram is divided into a plurality of frames, the first neural network model includes a plurality of first sub modules, and the extracting of a feature on the image of the mel-spectrogram includes extracting a feature on the image for each of the plurality of frames by utilizing the plurality of first sub modules.

As an alternative, the determining of whether an ARS voice is included in the audio data includes: determining a first probability representing whether a spoken voice is included in the audio data and a second probability representing whether the ARS voice is included in the audio data; determining whether a spoken voice is included in the audio data based on the first probability; and determining whether an ARS voice is included in the audio data based on the second probability.

As an alternative, the mel-spectrogram is divided into a plurality of frames, the determining of whether an ARS voice is included in the audio data further includes: determining the first probability and the second probability with respect to each of the plurality of frames; determining whether a spoken voice is included in each of the plurality of frames based on the first probability for each of the plurality of frames; and determining whether an ARS voice is included in each of the plurality of frames based on the second probability for each of the plurality of frames.

As an alternative, the audio data includes data in which a spoken voice and the ARS voice are mixed. The method further includes eliminating the ARS voice from the audio data.

In order to achieve the above-described objects, according to an exemplary embodiment of the present disclosure, a computer program stored in a computer readable storage medium is disclosed. When the computer program is executed by one or more processors, the computer program performs the following operations to detect a voice from audio data and the operations include: obtaining audio data; generating image data based on a spectrum of the obtained audio data; analyzing the generated image data by utilizing a pre-trained neural network model; and determining whether an automated response system (ARS) voice is included in the audio data, based on the analysis of the image data.

In order to achieve the above-described benefits, a computing device according to an exemplary embodiment of the present disclosure is disclosed. The device includes: a processor including at least one core; a memory including executable program codes in the processor; and a network unit which obtains an audio file, the processor is configured to generate image data based on a spectrum of the obtained audio data; analyze the generated image data by utilizing a pre-trained neural network model; and determine whether an automated response system (ARS) voice is included in the audio data, based on the analysis of the image data.

The present disclosure may be utilized in various fields to detect a human voice and an interactive voice (for example, an IVR voice or an ARS voice) from audio data.

The effects of the present disclosure are not limited to the aforementioned effects, and various other effects are included within a range which is obvious to those skilled in the art from the following description.

DETAILED DESCRIPTION

Various exemplary embodiments will now be described with reference to drawings. In the present specification, various descriptions are presented to provide appreciation of the present disclosure. However, it is apparent that the exemplary embodiments can be executed without the specific description.

"Component," "module," "system," and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or." That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A," "a case including only B," and "a case in which A and B are combined."

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

Figure 1:
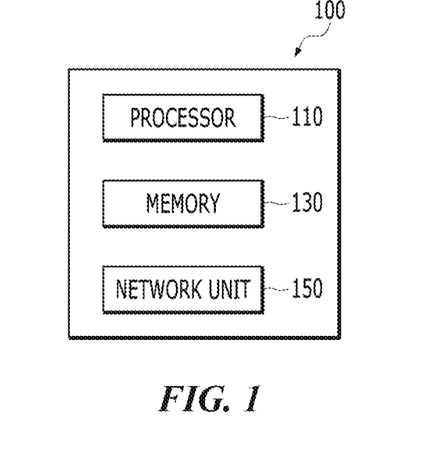
FIG. 1 is a block diagram of a computing device for detecting a voice from audio data according to an exemplary embodiment of the present disclosure.

FIG. 1 is a block diagram of a computing device for detecting a voice from audio data according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general-purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

According to an exemplary embodiment of the present disclosure, a processor 110 detects an IVR voice (=ARS voice) of an interactive voice response system (IVRS) from audio data (for example, a phone call). The processor 110 classifies a human voice and an interactive voice (for example, an IVR voice and ARS voice). For example, the interactive voice (for example, the IVR voice or the ARS voice) is used by recording a TTS voice or an actual human voice. That is, it means that a classification result of the model needs to vary depending on whether the same human voice is directly spoken or recorded to be played. Further, the audio data (input voice) is a voice received through the phone so that a fine voice characteristic may be lost depending on a call quality and a reception condition. The processor 110 extracts and classifies an ambiguous characteristic or a fine characteristic of the human voice and the interactive voice (for example, the IVR voice or the ARS voice) from the audio data (for example, a phone call) by utilizing a pre-trained neural network. For example, the pre-trained neural network may be a convolution recurrent neural network model (CRNN) in which a convolution neural network (CNN) and a recurrent neural network (RNN) are combined.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 110 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

The network unit 150 according to an exemplary embodiment of the present disclosure may use an arbitrary type known wired/wireless communication systems.

Figure 2:
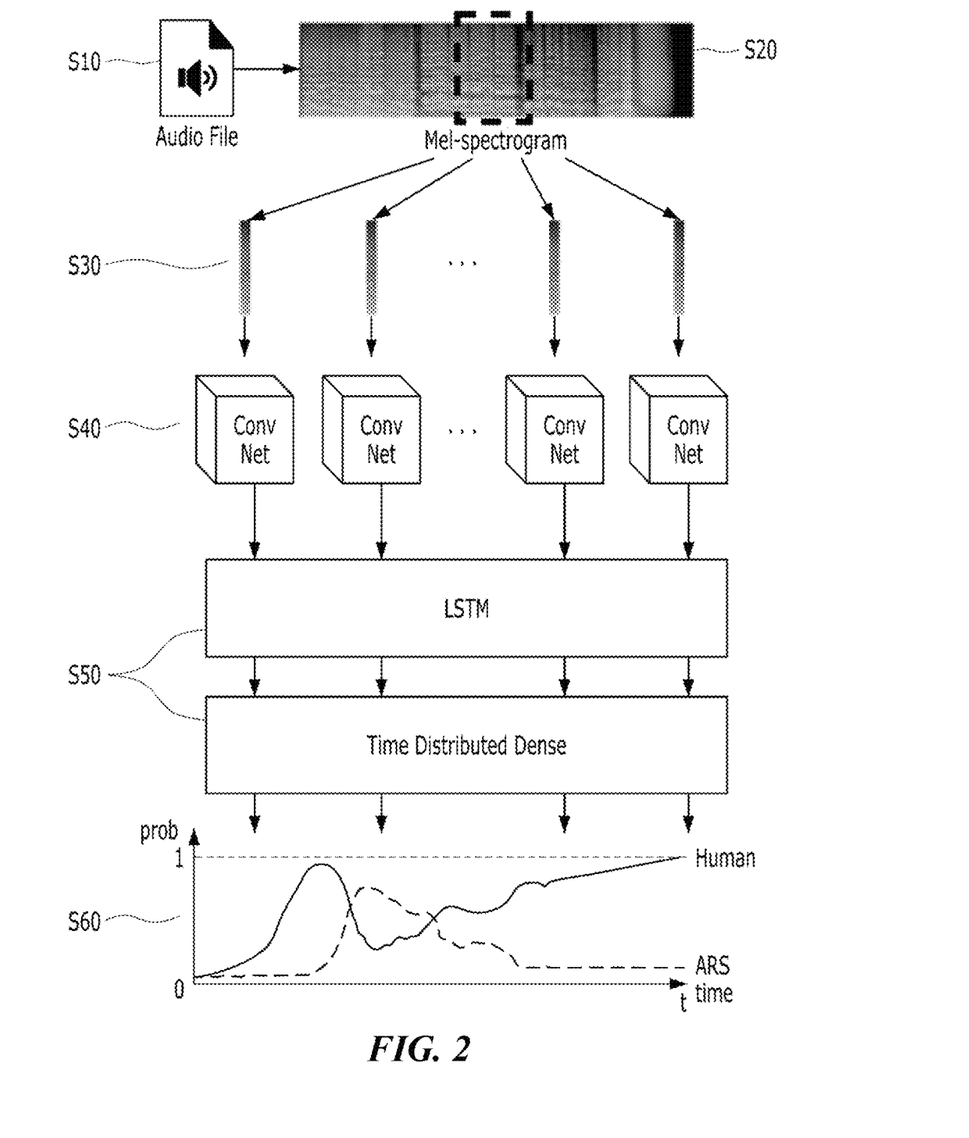
FIG. 2 is a view schematically illustrating an operation of detecting a voice from audio data according to an exemplary embodiment of the present disclosure.

FIG. 2 is a view schematically illustrating an operation of detecting a voice from audio data according to an exemplary embodiment of the present disclosure.

According to an exemplary embodiment of the present disclosure, the processor 110 may obtain audio data (S10). The audio data may include data in which a spoken voice and an ARS voice are mixed. For example, the audio data may be phone call data. The ARS voice may be a previously recorded human voice or text-to-speech (TTS) voice. For example, the ARS Voice may include "You are not answering the phone . . . " or a voice which is directly recorded by a user.

According to the exemplary embodiment of the present disclosure, the processor 110 may generate image data based on a spectrum of the obtained audio data. For example, the processor 110 may generate a mel-spectrogram based on the spectrum of the obtained audio data (S20). Further, the processor 110 divides the generated mel-spectrogram in the unit of a predetermined time to generate a plurality of frames (S30). In other words, the processor 110 may divide the mel-spectrogram into a plurality of frames. Here, the processor 110 divides the mel-spectrogram into units oft seconds to generate a plurality of frames. For example, a predetermined time unit may be 5 seconds or 8 seconds, but is not limited thereto.

According to the exemplary embodiment of the present disclosure, the processor 110 may analyze the generated image data by utilizing a pre-trained neural network model. Here, the pre-trained neural network model includes a first neural network model and a second neural network model. Further, the processor 110 extracts a feature on the image of the mel-spectrogram by utilizing the first neural network model (S40). For example, the processor 110 extracts a feature of a local image of the mel-spectrogram by utilizing the first neural network model. In the meantime, the first neural network model includes a convolutional neural network (CNN) model. Further, the first neural network model includes a plurality of first sub modules. In this case, the processor 110 extracts the feature on the image for each of the plurality of frames by utilizing a plurality of first sub modules. For example, the processor 110 may extracts the feature on the image for each of the plurality of frames after sequentially inputting the plurality of frames generated in step S30 into the plurality of first sub modules. In the meantime, each of the plurality of first sub modules may include a convolutional neural network layers (CNN layers).

Further, the processor 110 additionally extracts a time-series feature of the mel-spectrogram by utilizing the second neural network model (S50). For example, the processor 110 may additionally extract the time-series feature of the mel-spectrogram by utilizing the second neural network model in addition to the feature (feature on the image) extracted from the first neural network model. Here, the second neural network model may include a long short-term memory (LSTM) model and in addition to this model, may include various models which extract time-series features. The first neural network model and the second neural network model may be sequentially connected with a feed forward structure. Accordingly, the processor 110 may sequentially extract both the feature on the image and the time series feature of the mel-spectrogram, by means of sequential feature extracting operations of the first neural network model and the second neural network model and allow the extracted features to be utilized for inference or prediction.

Further, the processor 110 may determine whether the automated response system (ARS) voice is included in the audio data based on the analysis of the image data. For example, the processor may determine whether the ARS voice is included in the audio data based on the feature on the image of the mel-spectrogram extracted by the first neural network model. Further, the processor 110 may determine whether the ARS voice is included in the audio data based on the analysis of the image data and the time-series analysis. For example, the processor 110 may determine whether the ARS voice is included in the audio data, based on the feature on the image of the mel-spectrogram and the time-series feature extracted by the first neural network model and the second neural network model.

Further, the processor 110 may determine whether the ARS voice is included in the entire audio data or determine whether the ARS voice is included in each frame in the unit of frames.

Further, the processor 110 may determine whether the ARS voice is included in the audio data, based on the predicted probability value. Further, the processor 110 may determine "whether a spoken voice is included in the audio data" and "whether the ARS voice is included in the audio data," based on the plurality of probability values. For example, the processor 110 determines a first probability indicating whether a spoken voice is included in the audio data and a second probability indicating whether an ARS voice is included in the audio data (S60). In this case, the processor 110 may determine whether the spoken voice is included in the audio data, based on the first probability. The spoken voice may be a voice which is directly spoken by the user, rather than a previously recorded voice or a TTS voice. Further, the processor 110 may determine whether the ARS voice is included in the audio data, based on the second probability. For example, when the first probability and the second probability are equal to or larger than a predetermined reference value (for example, 0.5), the processor 110 may determine that the spoken voice and the ARS voice are included in the audio data. In contrast, when the first probability is equal to or smaller than a predetermined reference value, the processor 110 may determine that the spoken voice is not included in the audio data. Further, when the second probability is equal to or smaller than a predetermined reference value, the processor 110 may determine that the ARS voice is not included in the audio data.

According to the exemplary embodiment of the present disclosure, the processor 110 determines whether the ARS voice is included in each frame based on a probability value calculated for each of the plurality of frames. Here, the plurality of frames may be generated by dividing mel-spectrogram of the audio data, as described above. Further, the processor 110 may determine whether a spoken voice is included in each frame" and "whether the ARS voice is included in each frame, based on the plurality of probability values calculated for each frame. For example, the processor 110 may determine the first probability and the second probability for each of the plurality of frames. Further, the processor 110 may determine whether the spoken voice is included in each of the plurality of frames, based on the first probability for each of the plurality of frames. Further, the processor 110 may determine whether the ARS voice is included in each of the plurality of frames, based on the second probability for each of the plurality of frames. For example, when the first probability and the second probability are equal to or larger than a predetermined reference value (for example, 0.5) for each of the plurality of frames, the processor 110 may determine that the spoken voice and the ARS voice are included in the frame. For example, when the first probability and the second probability of the specific frame (that is, a time period corresponding to a specific frame) is [0.723, 0.854], the processor 110 may determine that the frame is a period when the human and the ARS simultaneously speak.

According to an exemplary embodiment of the present disclosure, the processor 110 may eliminate the ARS voice from the audio data. For example, when the ARS voice is included in the obtained audio data in consideration of the determination result, the processor 110 eliminates the voice. Accordingly, the processor 110 eliminates only the ARS voice from the audio data to extract only voice spoken by the user to be used for analysis. Further, the processor 110 eliminates the ARS voice in the unit of frames. For example, the processor 110 may identify the frame including the ARS voice, among the plurality of frames and then identify a frame including only a voice spoken by the user by eliminating the ARS voice from the identified frame. In this case, the processor 110 eliminates the ARS voice in the unit of frames so that a processing for eliminating the ARS voice may be performed only on a target frame without processing the entire audio data. Accordingly, consumption of the processing resource may be suppressed by this operation.

Hereinafter, Table 1 is a layer structure of an IVR voice (ARS voice) period detection model. As a result of experiment with several layer structures, it was confirmed that a configuration of Table 1 shows the best performance. For example, when the first neural network model reviewed above was implemented to include neural network layers (for example, Conv 1a, Conv 1b, Pooling 1, Conv 2a, Conv 2b, Conv 2c, Pooling 2, Conv 3, Pooling 3) having an output size and a specification presented in Table 1 and the second neural network model was implemented to include a neural network layer (for example, BiLSTM) having the output size and the specification presented in Table 1, the performance of detecting the ARS voice in voice data was the best. In the meantime, the human voice data used for the experiment utilized published data of AI HUB3. Further, the IVR voice (ARS voice) data include 1) data generated by a TTS service provider, 2) collected from published IVR voice (ARS voice) data, and 3) actual IVR voice (ARS voice) recorded data. In the meantime, there is a problem in that the IVR voice (ARS voice) data had an uneven distribution due to limited types, as compared with the human voice data. In order to solve this problem, various types of TTS services were used and as many IVR voice (ARS voice) data were collected as possible. The collected human and IVR voice (ARS voice) data were synthesized and labeled by Scaper and data augmented by this process were utilized as actual training data.

Table 2 is a confusion matrix representing a performance index of a model according to Table 1. The performance evaluation was conducted with data collected from AI HUB or IVR voice (ARS voice) data collected by recording actual spam calls and all the data were not used in the synthesis process. As a result of experiment, the accuracy was 98.1%, the precision was 99.59%, and the recall was 96.60%. In particular, the precision was significantly higher than the recall. As a result of analyzing the model output result, a probability of determining as actual human voices around a section in which unnecessary words such as "um'" or "uh-" were located in the voice was significantly increased. Further, if a speaking speed was 1) constant, 2) fast, and 3) speaking without a break for a long time, a probability of determining as the IVR voice (ARS voice) was increased. However, the distribution of human voice was broader than the distribution of the IVR voice (ARS voice) and some of the actual human voices had characteristics 1), 2), and 3) of the IVR voice (ARS voice). The difference between the recall and the precision seemed to be caused by the difference in the distributions of two voices.

TABLE 1

| Layer | Output size | Specification |
|---|---|---|
| Input | (32, 40) | 32 × 40 mel-spectrogram image |
| Conv 1aConv 1b | (32, 40, 64) | 3 × 3, 64, BatchNorm, l2, relu |
|  | (32, 40, 128) | 3 × 3, 128, l2, relu |
| Pooling 1 | (16, 20, 128) | 2 × 2 max pool, stride = 1, same padding |
| Conv 2a Conv 2b | (16, 20, 64) | 3 × 3, 64, BatchNorm, l2, relu |
| Conv 2c | (16, 20, 128) | 3 × 3, 128, l2, relu |
|  | (16, 20, 96) | 3 × 3, 96, l2, relu |
| Pooling 2 | (8, 10, 96) | 2 × 2 max pool, stride = 1, same padding |
| Conv 3 | (8, 10, 256) | 3 × 3, 256, l2, relu |
| Pooling 3 | (4, 5, 256) | 2 × 2 max pool, stride = 1, same padding |
| Reshape | (32, 160) |  |
| BiLSTM | (32, 32) | 32 hidden unit |
| Time-distributed Dense 1 | (32, 8) | l2, sigmoid |
| Time-distributed Dense 2 | (32, 2) | l2, sigmoid |
| Output | (32, 2) | adam, binary cross entropy |

TABLE 2

|  | Answer | |
|---|---|---|
|  | Voice | IVR |
| Predict Voice | 483 | 2 |
| IVR | 17 | 498 |

Exemplary embodiments of the present disclosure proposes a detection model using a pre-trained neural network model (for example, a convolution recurrent neural network (CRNN) model in which a convolution neural network (CNN) and a recurrent neural network (RNN) are combined) to identify the presence and a section of the IVR voice (ARS voice) and provides a model for detecting an IVR voice (ARS voice) section with an accuracy of 98.1% and a precision of 99.59% for a call recording data set collected in an actual environment. In the meantime, as a result of analyzing the trained model, the proposed model learned a feature that the IVR voice (ARS voice) spoke concisely and continuously while maintaining a fast tempo.

For example, in the "system to call the people to be cared to check if they are doing well" used by the welfare center, when the people to be cared did not call, an interactive voice response (for example, ARS voice, IVR voice) such as "The customer did not answer the phone . . . " can be output as automatic response. This is not a simple TTS voice, but may be a voice directly recorded by the subject.

In this situation, the processor 110 according to the exemplary embodiment of the present disclosure detects an interactive voice response (for example, the ARS voice and IVR voice) part from the entire audio data to solve the problem in that an interactive voice response (e.g., ARS voice, IVR voice) is incorrectly judged as a response by a people to be cared when the people to be cared fails to respond.

Further, when the audio data is processed to speech to text (STT), the processor 110 according to the exemplary embodiment of the present disclosure determines a recognition rate (or an error rate) using a character error rate (CER) or a word error rate (WER) and the ARS voice detection function may be utilized with regard to the recognition rate evaluation. For example, the processor 110 according to the exemplary embodiment of the present disclosure eliminated the ARS part from the audio data including the ARS response to determine the recognition rate of the STT model only for a part having an actual human voice. Accordingly, the recognition rate of the STT model only for the actually spoken voice is determined so that the accuracy of evaluating the recognition rate may be further improved.

In the meantime, it is very important to obtain good quality data in the deep learning and in many cases, it is difficult to use the data provided by the data providing companies for actual learning. The processor 110 according to the exemplary embodiment of the present disclosure processes raw data to obtain good quality data to be used for the learning. For example, the processor 110 according to the exemplary embodiment of the present disclosure may extract only the customer's spoken voices (by identifying and eliminating the ARS voice) from the huge amount of call recordings held by the call center and good quality data only formed of human spoken voices may be obtained by this process.

Hereinafter, an operation flow of the present disclosure will be described in brief based on the above detailed description.

Figure 3:
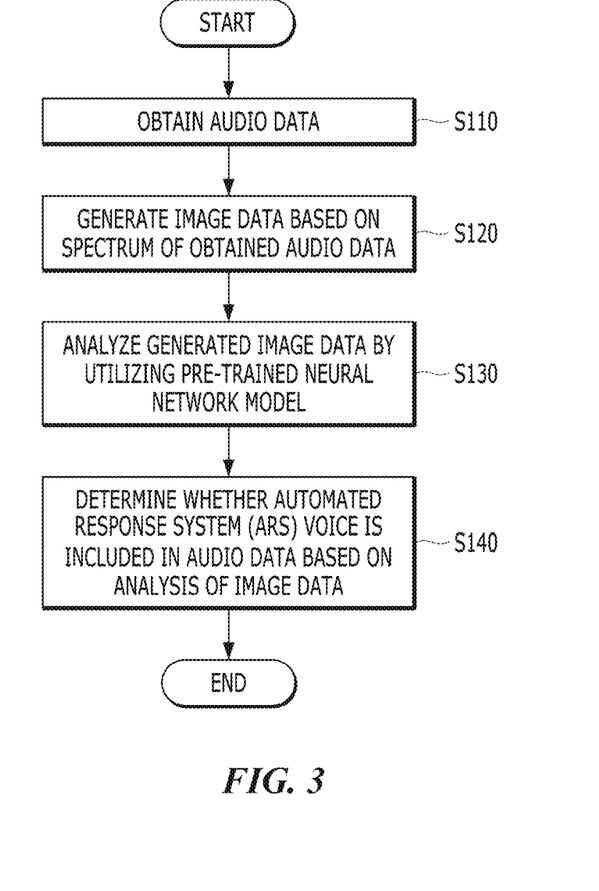
FIG. 3 is a flowchart illustrating a method for detecting a voice from audio data according to the exemplary embodiment of the present disclosure.

FIG. 3 is a flowchart illustrating a method for detecting a voice from audio data according to the exemplary embodiment of the present disclosure.

A method for detecting a voice from audio data illustrated in FIG. 3 may be performed by the above-described computing device 100. Therefore, even though some contents are omitted, the contents which have been described for the computing device 100 may be applied to the description of the method for detecting a voice from the audio data in the same manner.

According to an exemplary embodiment of the present disclosure, the computing device 100 may obtain audio data (S110). The audio data may include data in which a spoken voice and an ARS voice are mixed.

The computing device 100 generates image data based on a spectrum of the obtained audio data (S120). For example, the computing device 100 may generate a mel-spectrogram which is image data, based on the spectrum of the obtained audio data.

Further, the computing device 100 analyzes the generated image data by utilizing a pre-trained neural network model (S130). Here, the pre-trained neural network model includes a first neural network model which extracts a feature on the image of the mel-spectrogram and a second neural network model which additionally extracts a time-series feature of the mel-spectrogram. Further, the first neural network model includes a convolutional neural network (CNN) and the second neural network model includes a long short term memory (LSTM) model.

Further, according to the exemplary embodiment of the present disclosure, the computing device 100 may determine whether the automated response system (ARS) voice is included in the audio data based on the analysis of the image data (S140). Further, the computing device 100 determines a first probability indicating whether a spoken voice is included in the audio data and a second probability indicating whether an ARS voice is included in the audio data.

In the above-description, steps S110 to S140 may be further divided into additional steps or combined as smaller steps depending on an implementation example of the present disclosure. Further, some steps may be omitted if necessary and the order of steps may be changed.

Figure 4:
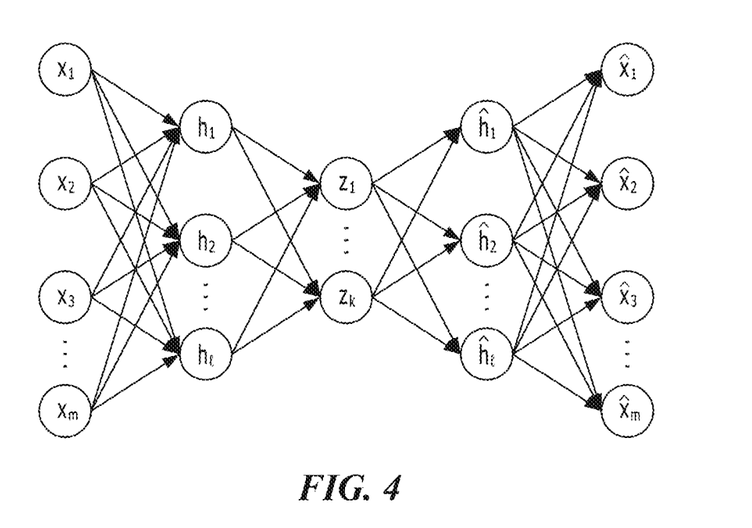
FIG. 4 is a conceptual view illustrating a neural network according to an exemplary embodiment of the present disclosure.

FIG. 4 is a schematic diagram illustrating a network function according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting training data into the neural network and calculating the output of the neural network for the training data and the error of a target and back-propagating the errors of the neural network from the output layer of the neural network toward the input layer in a direction to reduce the errors to update the weight of each node of the neural network. In the case of the supervised learning, the training data labeled with a correct answer is used for each training data (e.g., the labeled training data) and in the case of the unsupervised learning, the correct answer may not be labeled in each training data. That is, for example, the training data in the case of the supervised learning related to the data classification may be data in which category is labeled in each training data. The labeled training data is input to the neural network, and the error may be calculated by comparing the output (category) of the neural network with the label of the training data. As another example, in the case of the unsupervised learning related to the data classification, the training data as the input is compared with the output of the neural network to calculate the error. The calculated error is back-propagated in a reverse direction (e.g., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the training data may be generally a subset of actual data (e.g., data to be processed using the learned neural network), and as a result, there may be a learning cycle in which errors for the training data decrease, but the errors for the actual data increase. Overfitting is a phenomenon in which the errors for the actual data increase due to excessive learning of the training data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the training data, regularization, dropout of omitting a part of the node of the network in the process of learning, utilization of a batch normalization layer, etc., may be applied.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes." The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 5:
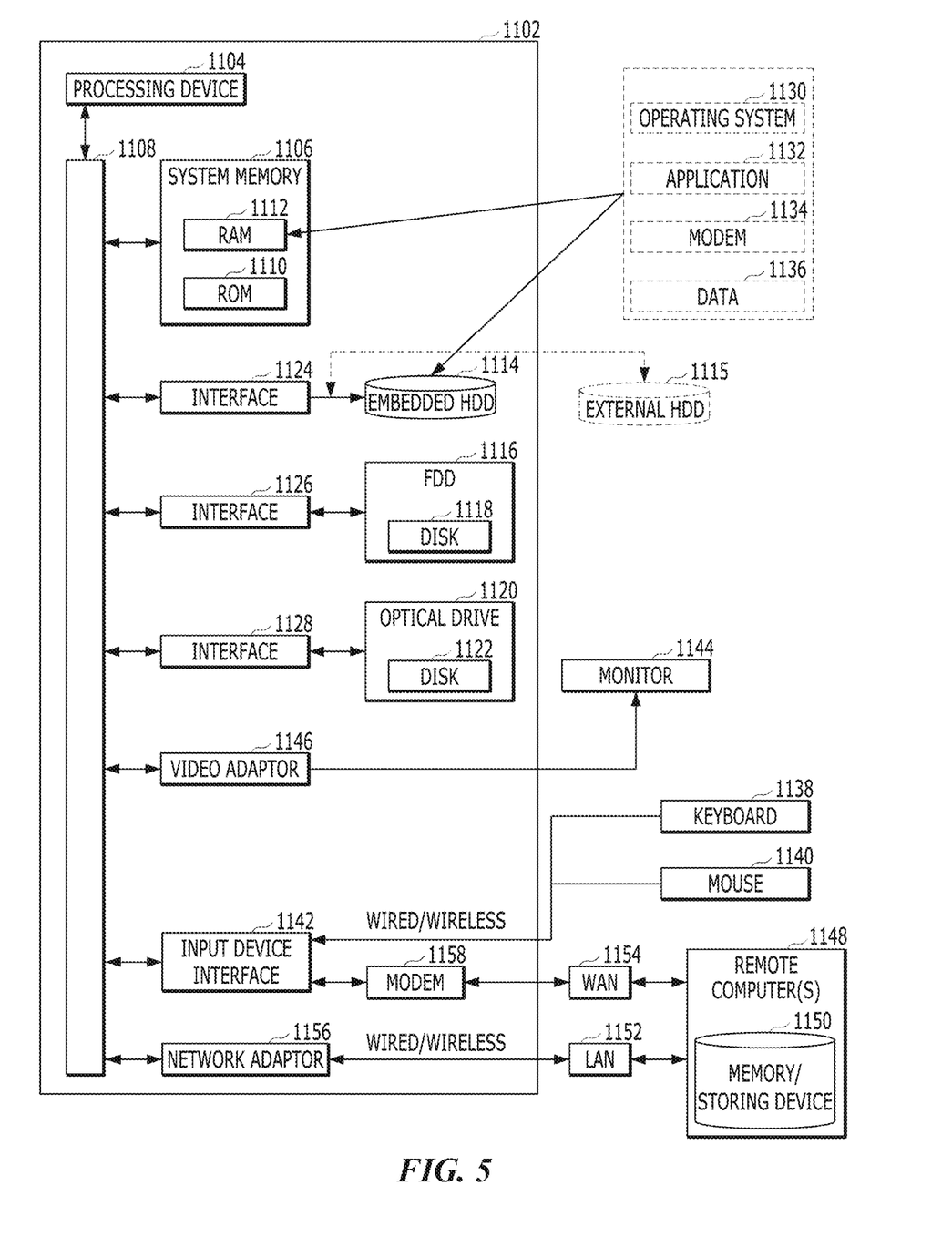
FIG. 5 is a block diagram of a computing device according to an exemplary embodiment of the present disclosure.

FIG. 5 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for detecting a voice from audio data, performed by a computing device including at least one processor, the method comprising:
   obtaining audio data;
   generating image data based on a spectrum of the obtained audio data;
   extracting a feature on the image data by utilizing a first neural network model; and
   extracting a time-series feature of the image data by utilizing a second neural network model sequentially connected with the first neural network model;
   determining whether an automated response system (ARS) voice is included in each of a plurality of sections of the audio data, based on the feature on the image data and the time-series feature of the image data;
   eliminating a section including the ARS voice, among the plurality of sections of the audio data; and
   generating input data or training data for analysis of spoken voice based on remaining sections excluding the eliminated section, among the plurality of sections of the audio data.

2. The method according to claim 1, wherein the generating of the image data includes:
   generating a mel-spectrogram based on the spectrum of the obtained audio data.

3. The method according to claim 2, wherein the generating of the image data further includes:
   generating a plurality of frames by dividing the generated mel-spectrogram in a predetermined time unit.

4. The method according to claim 3,
   wherein the extracting the feature on the image data includes:
      extracting a feature on the image of the mel-spectrogram by utilizing the first neural network model; and
   wherein the extracting the time-series feature of the image data includes:
      further extracting a time-series feature of the mel-spectrogram by utilizing the second neural network model.

5. The method according to claim 4, wherein the first neural network model includes a convolutional neural network (CNN) model and the second neural network model includes a long short-term memory (LSTM) model.

6. The method according to claim 4, wherein the mel-spectrogram is divided into the plurality of frames,
   the first neural network model includes a plurality of first sub modules, and
   the extracting of the feature on the image of the mel-spectrogram includes:
      extracting the feature on the image for each of the plurality of frames by utilizing the plurality of first sub modules.

7. The method according to claim 2, wherein the determining of whether an ARS voice is included in the audio data includes:
   determining a first probability representing whether a spoken voice is included in the audio data and a second probability representing whether the ARS voice is included in the audio data;
   determining whether the spoken voice is included in the audio data based on the first probability; and
   determining whether the ARS voice is included in the audio data based on the second probability.

8. The method according to claim 7, wherein the mel-spectrogram is divided into a plurality of frames,
   the determining of whether the ARS voice is included in the audio data further includes:
      determining the first probability and the second probability with respect to each of the plurality of frames;
      determining whether the spoken voice is included in each of the plurality of frames based on the first probability for each of the plurality of frames; and
      determining whether the ARS voice is included in each of the plurality of frames based on the second probability for each of the plurality of frames.

9. A computer program stored in a non-transitory computer readable storage medium, wherein when the computer program is executed by one or more processors to perform the following operations to detect a voice from audio data, the operations including:
   obtaining audio data;
   generating image data based on a spectrum of the obtained audio data;
   extracting a feature on the image data by utilizing a first neural network model; and
   extracting a time-series feature of the image data by utilizing a second neural network model sequentially connected with the first neural network model;

determining whether an automated response system (ARS) voice is included in each of a plurality of sections of the audio data, based on the feature on the image data and the time-series feature of the image data;

eliminating a section including the ARS voice, among the plurality of sections of the audio data; and generating input data or training data for analysis of spoken voice based on remaining sections excluding the eliminated section, among the plurality of sections of the audio data.

10. A computing device, comprising:

a processor including at least one core;

a memory including executable program codes in the processor; and a network unit for obtaining an audio file, wherein the processor is configured to:

generate image data based on a spectrum of the obtained audio data;

extract time-series feature of the image data by utilizing a first neural network model; and     extract time-series feature of the image data by utilizing a second neural network model sequentially connected with the first neural network model;

determine whether an automated response system (ARS) voice is included in each of a plurality of sections of the audio data, based on the feature on the image data and the time-series feature of the image data;

eliminate a section including the ARS voice, among the plurality of sections of the audio data; and     generate input data or training data for analysis of spoken voice based on the remaining sections excluding the eliminated section, among the plurality of sections of the audio data.

\* \* \* \* \*